F. LAGELBAUER.
ROCKING HORSE.
APPLICATION FILED SEPT. 29, 1920.
1,383,468.
Patented July 5, 1921.
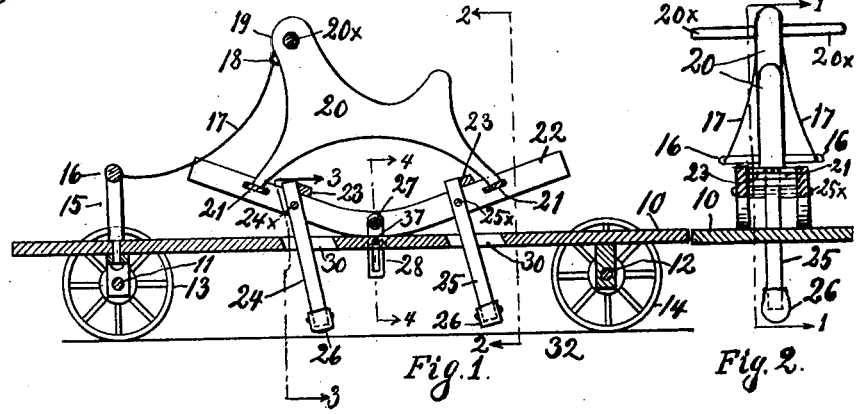
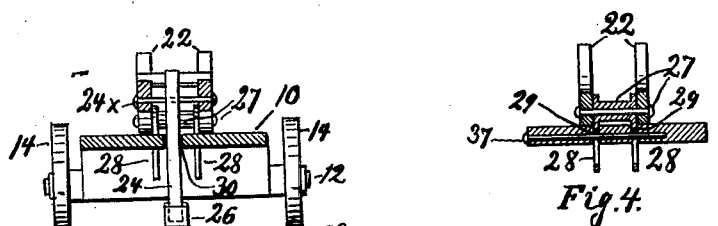
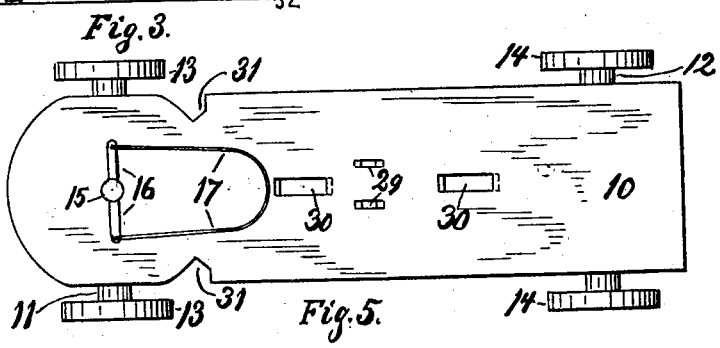
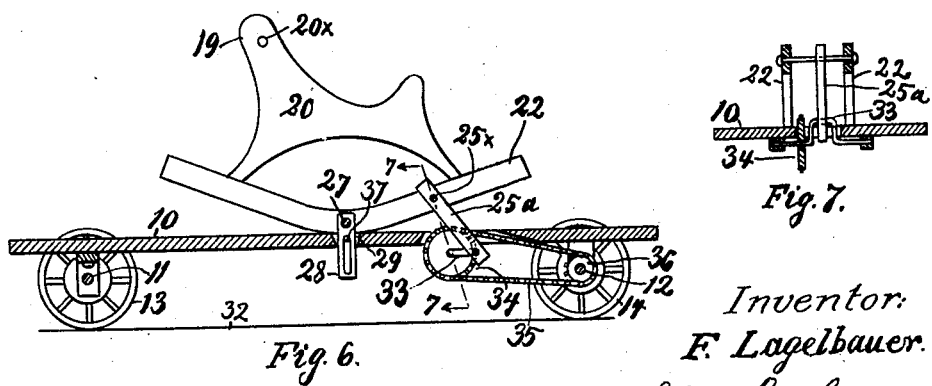
Inventor:
F. Lagelbauer.
By A. M. Carlsen.
his Attorney.

UNITED STATES PATENT OFFICE.

FERDINAND LAGELBAUER, OF ST. PAUL, MINNESOTA.

ROCKING-HORSE.

1,383,468.

Specification of Letters Patent. Patented July 5, 1921.

Application filed September 29, 1920. Serial No. 413,512.

*To all whom it may concern:*

Be it known that I, FERDINAND LAGELBAUER, a citizen of Bohemia, who have declared my intention to become a citizen of the United States, residing at St. Paul, in the county of Ramsey and State of Minnesota, have invented a new and useful Rocking-Horse, of which the following is a specification.

My invention relates to rocking horses and the object is to provide a toy horse or children's rocking horse so constructed that it will automatically travel forward during its rocking movement.

In the accompanying drawing:

Figure 1 is a longitudinal vertical section of the rocking horse on the line 1—1 in Fig. 2. Fig. 2 is a cross section of the toy on the line 2—2 in Fig. 1 with ground wheels omitted. Fig. 3 is a section on the line 3—3 in Fig. 1. Fig. 4 is a section on line 4—4 in Fig. 1. Fig. 5 is a plan view of the platform and supporting wheels of the toy. Fig. 6 is a longitudinal section of the toy with its propelling means modified. Fig. 7 is a cross section on the line 7—7 in Fig. 6.

Referring to the drawing by reference numerals, 10 designates a platform or body supported by two axles 11, 12 and ground wheels 13, 14. The front axle 11 is provided with a vertical stem 15 journaled in the platform and having at its upper end opposite lateral arms 16, to which a steering rope 17 has its ends fastened while the middle of the rope is slidable in a staple 18 fixed in the front of the neck or head 19 of a wooden horse 20. Said head is provided with lateral hand holds 20ˣ.

The horse is secured to the rockers 22 preferably by cross bars 21. The rockers are spaced apart and further secured together by cross bars 23. The last mentioned bars also serve to hold in a forwardly leaning position the upper ends of two propelling bars 24, 25, which are pivotally suspended at 24ˣ and 25ˣ respectively, to the rockers and have their bottom ends lined with rubber sockets 26, to make them work silently and without slipping on floors or sidewalks where they may be used.

Pivotally suspended from the inward side of each rocker is a guide 28 fixed on a rocker-shaft 27 and slidable up and down in apertures 29 in the platform and serving to hold the rockers in place on the platform so they can rock but not slide or turn, nor be accidentally lifted away, since the guides 28 are slotted and in the slots is placed a horizontal pin 37 inserted in the platform. The propelling rods or bars 24, 25, work in long slots 30 in the platform. 31 are clearance notches in the platform for the steering wheels 13 when they are swung much rearwardly.

In the operation of the toy the child takes its seat on the horse 20 and by rocking the horse in the usual manner the bars 24, 25 will engage the surface 32, and, being inclined, will push the whole device forward on its wheels 13—14 while it is being steered by the normally slack rope or cord 17. The bars 24—25 may slide on the ground as they start forward but they can never swing forward to or beyond a vertical position owing to cross bars 23.

In Figs. 6 and 7 it is shown that the propelling means may be so modified that the rear propelling bar 25ᵃ acts as a connecting rod driving a crank 33 on the shaft of which is fixed a sprocket 34, driving an endless chain 35 and thereby a sprocket 36 fixed on the rear axle, in which instance said axle is rotatable and fixed in at least one of the rear ground wheels. The principle is the same as in Fig. 1, in so far that the rocking of a horse mounted on a wheeled platform causes the platform to travel by means touching the ground.

What I claim is:

1. In a rocking horse, the combination with a platform and wheels supporting it, of a pair of rockers arranged to rock upon the platform and a seat representing the body of a horse mounted on the rockers; said platform having apertures near the middle of the rockers and the rockers having pivotally suspended guides slidable up and down in the apertures.

2. The structure specified in claim 1 together with means for preventing escape of the guides from the apertures.

3. The structure specified in claim 1, said platform having also longitudinal slots forward and rearward of the guides, actuating bars pivoted to the rockers and suspended through the slots and adapted to engage the surface on which the device stands and propel it forward by the rocking of the seat and rockers, and means for always holding said bars forwardly inclined at the tops when the lower ends are not in contact with the surface traveled over.

4. The structure specified in claim 1 together with means for steering the front wheels of the device.

5. The structure specified in claim 3 together with members of soft material covering the lower ends of the actuating bars.

In testimony whereof I affix my signature.

FERDINAND LAGELBAUER.